(12) United States Patent
Wariishi et al.

(10) Patent No.: US 7,566,511 B2
(45) Date of Patent: Jul. 28, 2009

(54) SOLID POLYMER CELL ASSEMBLY

(75) Inventors: Yoshinori Wariishi, Utsunomiya (JP); Naoyuki Enjoji, Utsunomiya (JP); Yoichi Asano, Utsunomiya (JP); Hiroshi Shinkai, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 774 days.

(21) Appl. No.: 10/521,059

(22) PCT Filed: Jun. 26, 2003

(86) PCT No.: PCT/JP03/08098

§ 371 (c)(1),
(2), (4) Date: Dec. 23, 2004

(87) PCT Pub. No.: WO2004/004055

PCT Pub. Date: Jan. 8, 2004

(65) Prior Publication Data

US 2005/0233181 A1 Oct. 20, 2005

(30) Foreign Application Priority Data

Jun. 26, 2002 (JP) ............................... 2002-186093

(51) Int. Cl.
*H01M 2/00* (2006.01)
*H01M 8/10* (2006.01)
(52) U.S. Cl. .......................................... 429/34; 429/32
(58) Field of Classification Search .................. 429/39, 429/30, 32, 34, 26
See application file for complete search history.

(56) References Cited

U.S. PATENT DOCUMENTS 6,821,661 B2 * 11/2004 Haridoss et al. ............... 429/13

FOREIGN PATENT DOCUMENTS

| JP | 04-206162 | 7/1992 |
|---|---|---|
| JP | 11-312531 | * 11/1999 |
| JP | 2000-268832 | 9/2000 |
| JP | 2001-006698 | 1/2001 |
| JP | 2001-006708 | 1/2001 |

* cited by examiner

*Primary Examiner*—Patrick Ryan
*Assistant Examiner*—Thomas H. Parsons
(74) *Attorney, Agent, or Firm*—Lahive & Cockfield, LLP; Anthony A. Laurentano, Esq.

(57) ABSTRACT

A cell assembly (10) includes a first unit cell (12) and a second unit cell (14). The first unit cell (12) and the second unit cell (14) are juxtaposed such that electrode surfaces of the first unit cell (12) and electrode surfaces of the second unit cell (14) are aligned in parallel with each other. An oxygen-containing gas flow passage (32) includes a first oxygen-containing gas passage (38) in the first unit cell (12), an oxygen-containing gas connection passage (40) in a connection passage member (16), and a second oxygen-containing gas passage (42) in the second unit cell (14). The first oxygen-containing gas passage (38), the oxygen-containing gas connection passage (40), and the second oxygen-containing gas passage (42) are connected serially from the first unit cell (12) to the second unit cell (14).

6 Claims, 5 Drawing Sheets

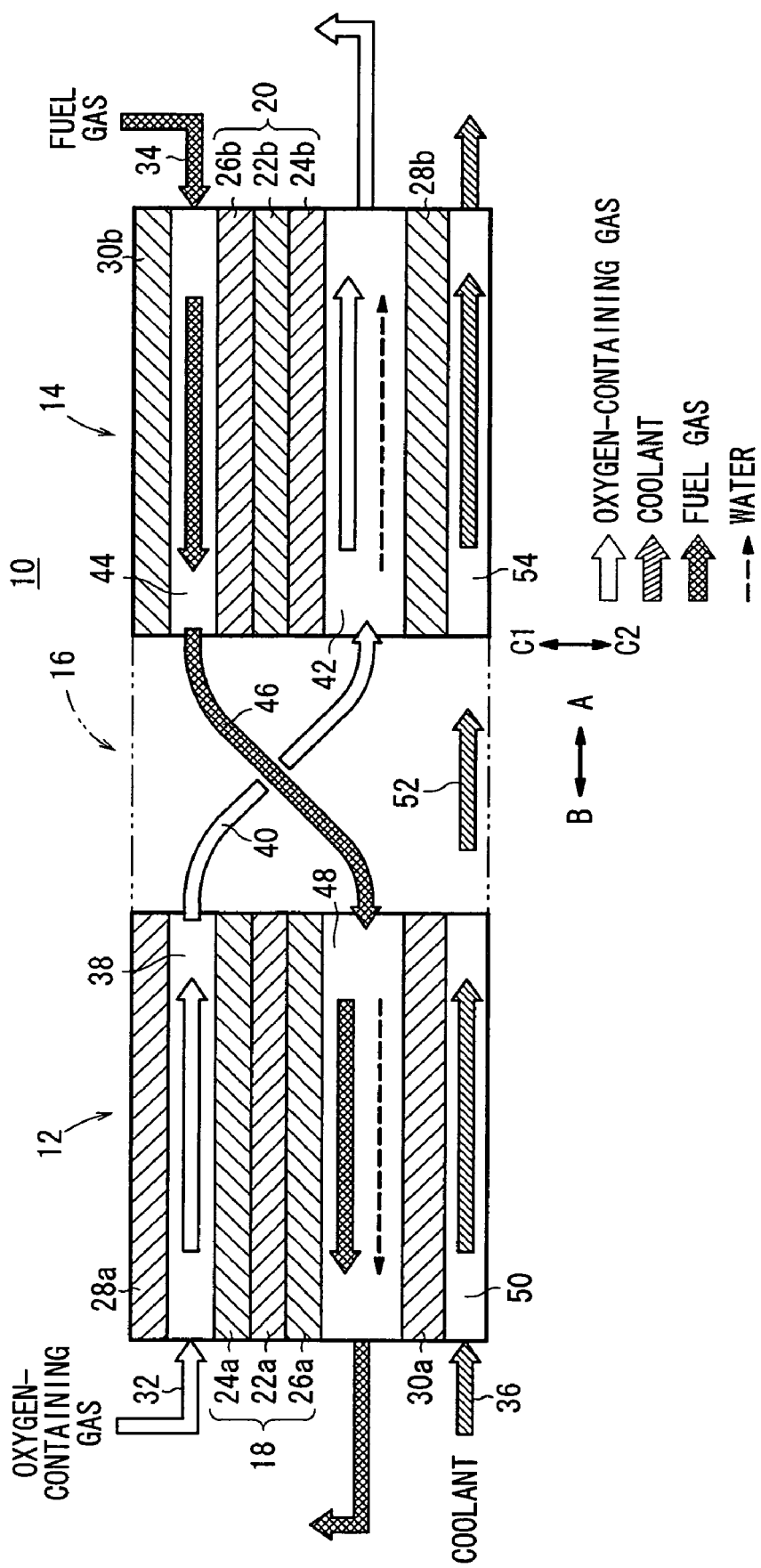

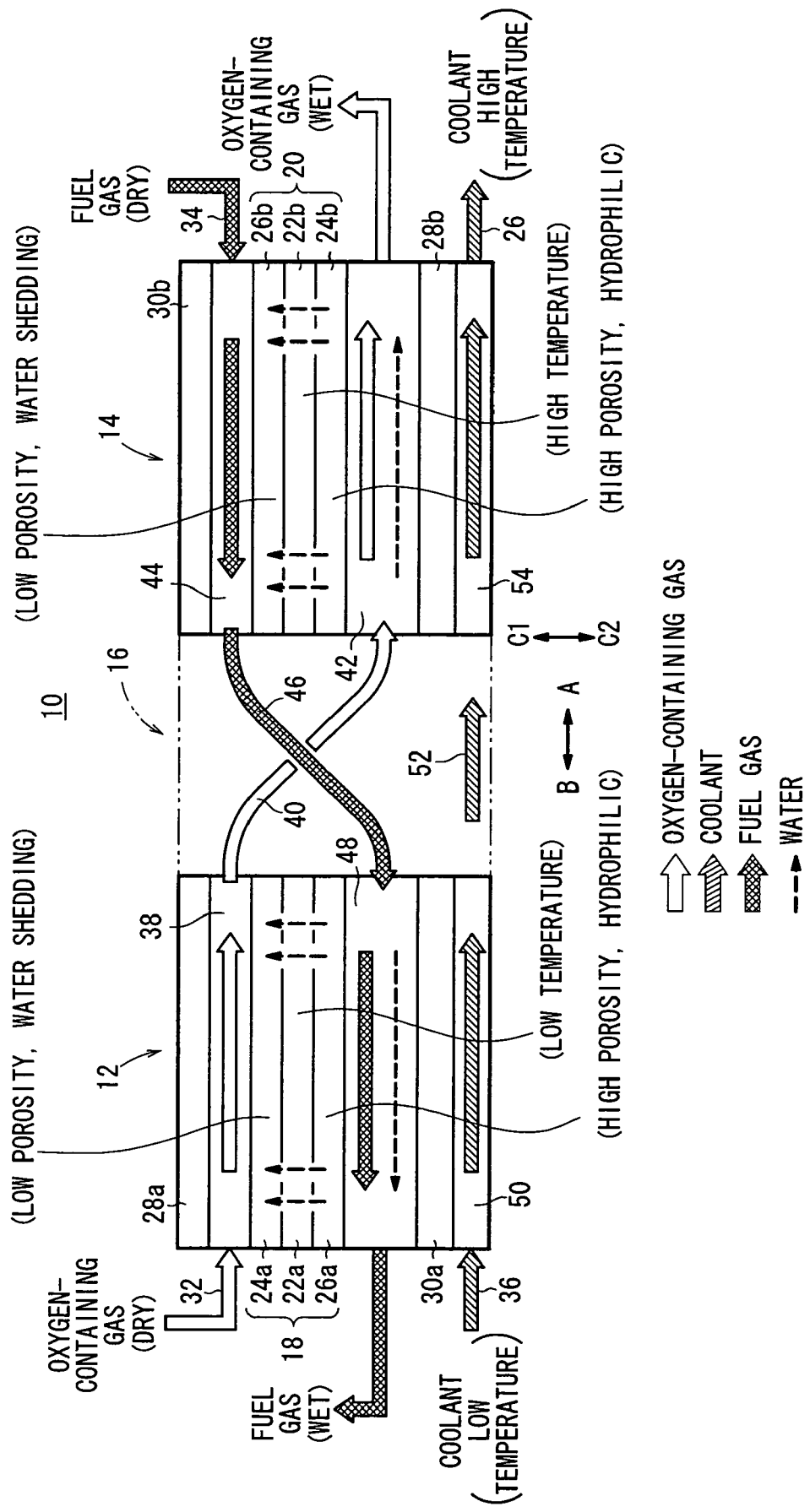

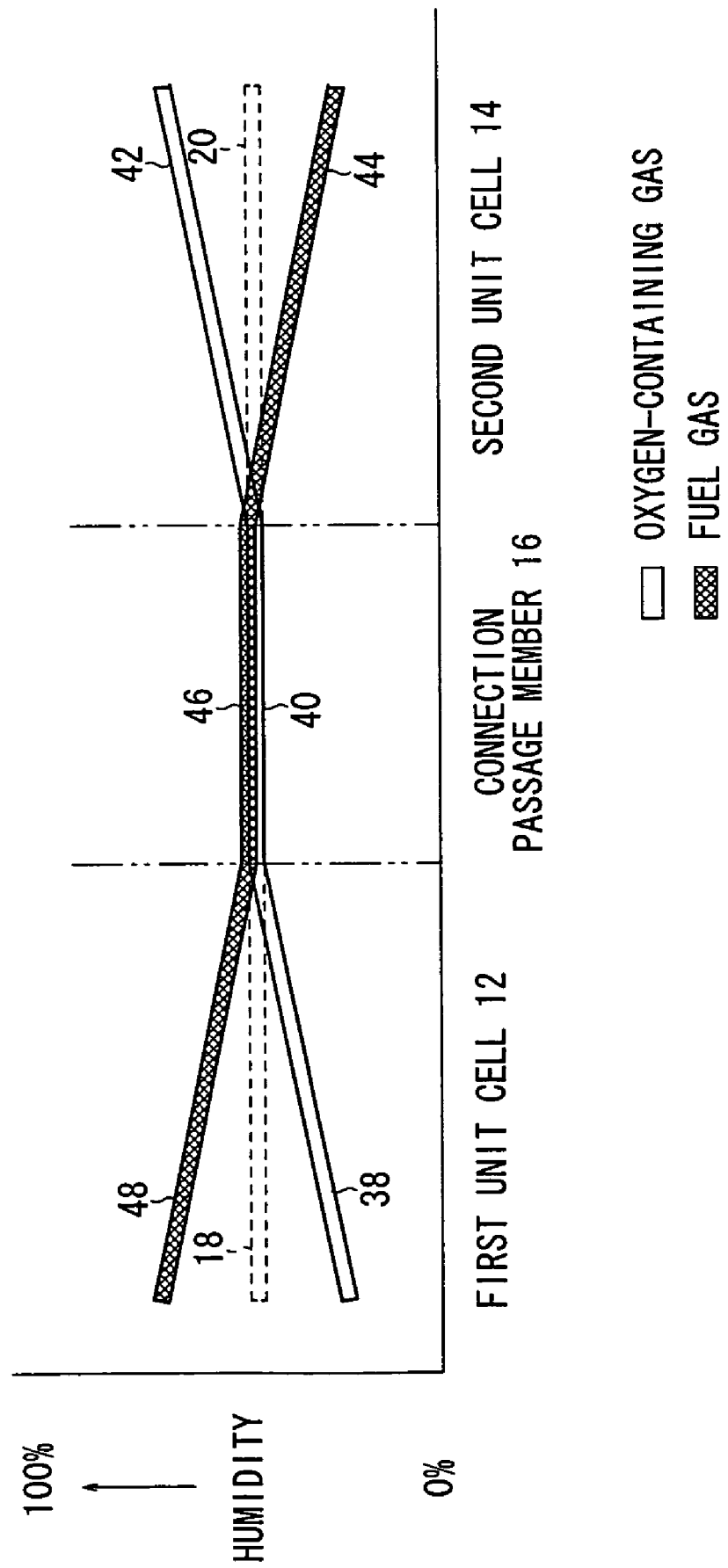

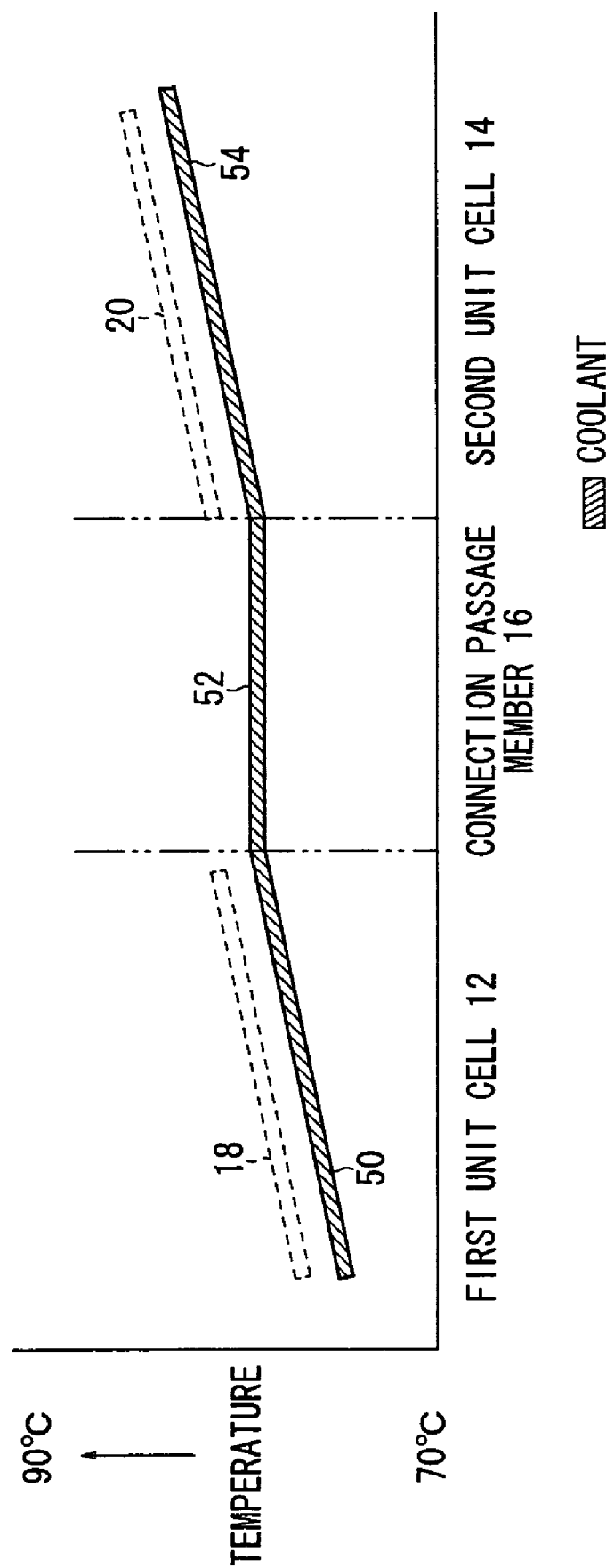

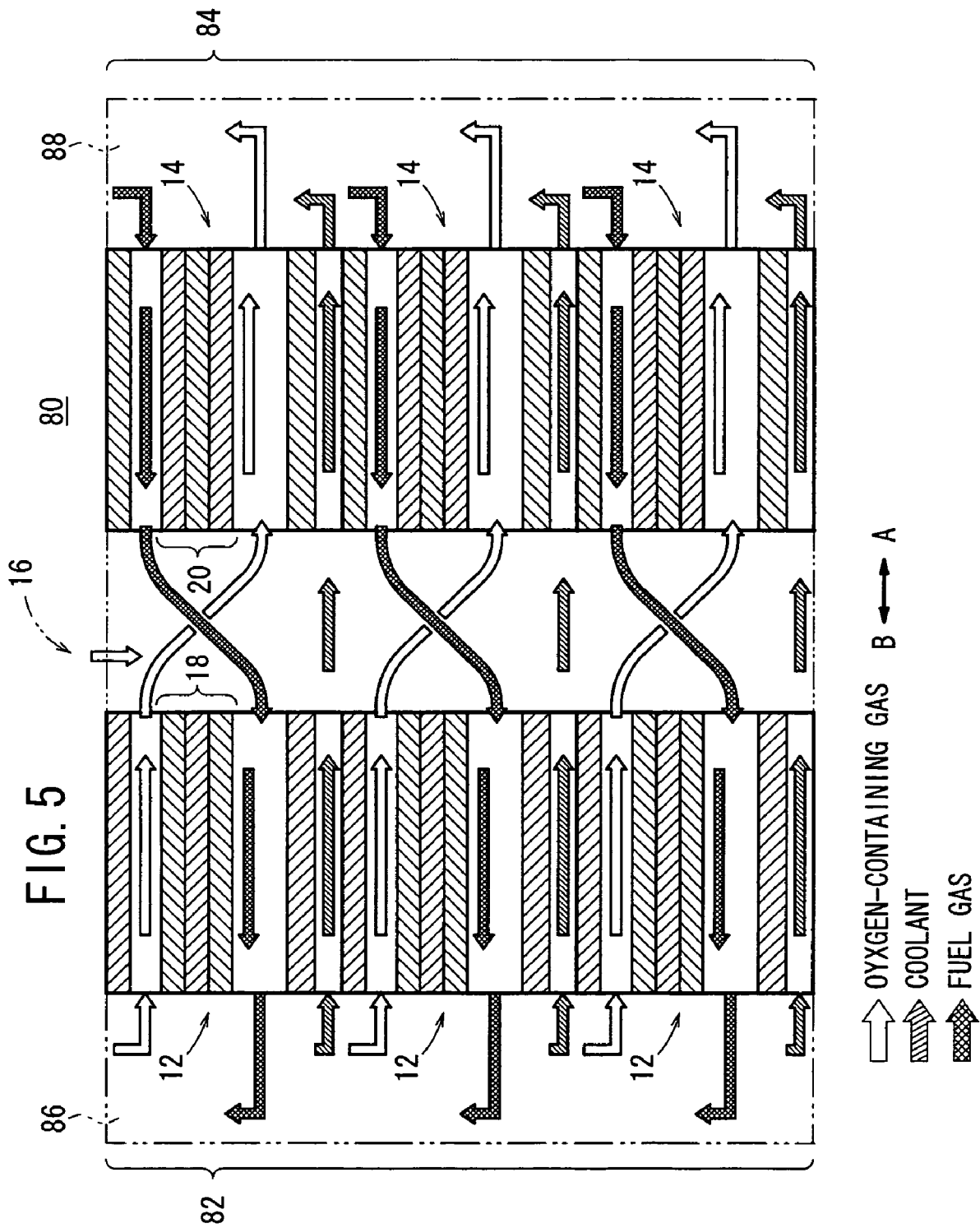

SOLID POLYMER CELL ASSEMBLY

RELATED APPLICATIONS

This application is a 35 U.S.C. 371 national stage filing of International Application No. PCT/JP2003/008098, filed 26 Jun. 2003, which claims priority to Japan Patent Application No. 2002-186093 filed on 26 Jun. 2002, in Japan. The contents of the aforementioned applications are hereby incorporated by reference.

TECHNICAL FIELD

The present invention relates to a solid polymer cell assembly including a plurality of unit cells connected together. Each of the unit cells has an assembly including an anode, a cathode, and a solid polymer electrolyte membrane interposed between the anode and the cathode. The unit cells are juxtaposed such that electrode surfaces of the unit cells are aligned in parallel with each other.

BACKGROUND ART

Generally, a polymer electrolyte fuel cell (PEFC) employs an electrolyte membrane. The electrolyte membrane is a polymer ion exchange membrane (proton ion exchange membrane). The electrolyte membrane is interposed between an anode and a cathode to form an assembly (electrolyte electrode assembly). Each of the anode and the cathode includes base material chiefly containing carbon, and an electrode catalyst layer of noble metal deposited on the base material. The electrolyte electrode assembly is sandwiched between separators (bipolar plates) to form a unit cell (unit power generation cell). In use, typically, a plurality of unit cells are stacked together to form a fuel cell stack.

In the fuel cell, a fuel gas such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electric current. A gas chiefly containing oxygen (hereinafter also referred to as the oxygen-containing gas) is supplied to the cathode. At the cathode, the hydrogen ions from the anode combine with the electrons and oxygen to produce water.

When the electrolyte membrane of the fuel cell is dried, it is not possible to maintain the operation at a high output density. Therefore, it is necessary to suitably humidify the electrolyte membrane. For this purpose, various humidification methods have been adopted conventionally. For example, in an external humidification method, the electrolyte membrane of the assembly is humidified by supplying water to the assembly using a humidifier such as a bubbler provided externally to the fuel cell. The humidifier humidifies reactant gases (fuel gas/oxygen-containing gas) supplied to the assembly. In an internal humidification method, a humidifier (humidification structure) for humidifying the electrolyte membrane is provided in the unit cell.

However, in the external humidification method, since the humidifier is provided externally to the fuel cell as an additional component, the fuel cell system is large as a whole. Thus, a large space is needed for the system. In particular, when the load of the fuel cell is increased rapidly, the humidifier may not have the capability for tracking the rapid increase of the load.

In one internal humidification method, strings for absorbing water are embedded in the electrolyte membrane. In another internal humidification method, water from the anode passes through a water permeable plate. In still another internal humidification method, water absorption strings are in contact with the electrolyte membrane on the anode side. However, in these methods, when the sufficient level of humidify is not achieved for some reasons, it is difficult to suitably recover the humidity in the fuel cell.

DISCLOSURE OF THE INVENTION

The present invention has been made taking the problems into account, and an object of the present invention is to provide a solid polymer cell assembly which achieves the desired humidified state reliably without using any special humidification devices.

According to the present invention, a cell assembly is formed by juxtaposing a plurality of unit cells together. Each of the unit cells includes an anode, a cathode, and a solid polymer electrolyte membrane interposed between the anode and the cathode. Electrode surfaces of the unit cells are aligned in parallel with each other. In the cell assembly, at least part of a reactant gas flow passage serially extends through the juxtaposed unit cells. The reactant gas flow passage is a passage of at least one of an oxygen-containing gas and a fuel gas. The meaning of "at least part of" herein includes at least one of a plurality of reactant gas flow passages, and at least part of a reactant gas flow passage itself.

Since the flow rate of the reactant gas required for reaction in the downstream unit cell (the unit cell on the downstream side) is taken into account, and the additional reactant gas is supplied to the upstream unit cell (the unit cell on the upstream side), the flow rate of the reactant gas supplied into the cell assembly is high. Thus, water condensation in the reactant gas flow passage is prevented, and the humidity is uniform in each of the unit cells. The current density distribution is uniform in each of the unit cells, and thus, concentration overpotential is reduced. Further, simply by increasing the flow rate of the reactant gas supplied into the cell assembly, water produced in each of the unit cells can be discharged efficiently. Water can be discharged from the cell assembly smoothly.

Moreover, since a long reactant gas flow passage connecting the unit cells are provided. The pressure loss is large. The reactant gas is distributed smoothly in each of the unit cells, and the reactant gas is discharged smoothly. In the cell assembly, the unit cells are juxtaposed such that electrode surfaces of the unit cells are aligned in parallel with each other. Thus, the unit cells can be handled independently, and thus, the performance test can be performed individually for each of the unit cells easily and reliably.

As described later in detail, for example, by determining the flow directions in the oxygen-containing gas flow passage and the fuel gas flow passage (reactant gas flow passages) and the flow direction in the coolant flow passage to create the humidity difference and the temperature difference between the upstream unit cell and the downstream unit cell, it is possible to supply a low humidified gas or a non-humidified gas to the cell assembly. Thus, without using any special humidification devices, it is possible to achieve the desired humidified state reliably.

The reactant gas flow passage serially extends through a passage on the upper side of an assembly of the upstream unit cell (unit cell provided on the upstream side in the flow direction of the reactant gas) and a passage provided on the lower side of an assembly of the downstream unit cell (unit cell provided on the downstream side in the flow direction of the reactant gas). Thus, water produced in the upstream unit cell is reliably discharged into the downstream unit cell by the gravity. With the simple structure, it is possible to prevent the condensed water from being trapped in the assembly. The excessive water is efficiently discharged into the reactant gas flow passage provided on the lower side of the assembly by the gravity.

The oxygen-containing gas and the fuel gas flow in a counterflow manner in the oxygen-containing gas flow passage and the fuel gas flow passage as the reactant gas flow passages along the surfaces of the assembly of the unit cell. Thus, water moves between the fuel gas flowing through the fuel gas flow passage and the oxygen-containing gas flowing through the oxygen-containing gas flow passage through the solid polymer electrolyte membrane. Accordingly, it is possible to reliably prevent the solid polymer electrolyte membrane from being dried. Thus, the low humidified reactant gas or non-humidified reactant gas can be supplied to the cell assembly.

In the structure, a coolant flow passage is provided such that a coolant flows serially from the upstream unit cell provided on the upstream side in the flow direction of the oxygen-containing gas (hereinafter also referred to as the $O_2$ upstream unit cell) to the downstream unit cell provided on the downstream side in the flow direction of the oxygen-containing gas (hereinafter also referred to as the $O_2$ downstream unit cell). Thus, temperature of the $O_2$ downstream unit cell is kept higher than temperature of the $O_2$ upstream unit cell.

The $O_2$ upstream unit cell is a low temperature unit cell and the $O_2$ downstream unit cell is a high temperature unit cell. The low temperature unit cell includes the inlet side of the oxygen-containing gas where the humidity is low and the outlet side of the fuel gas where the humidity is high. The high temperature unit cell includes the outlet side of the oxygen-containing gas where the humidity is high, and the inlet side of the fuel gas where the humidity is low. The humidity in the $O_2$ upstream unit cell is high due to the water produced in power generation. However, the relative humidity of the oxygen-containing gas is low since the temperature of the $O_2$ upstream unit cell is high. Accordingly, water condensation does not occur in the $O_2$ upstream unit cell. The current density distribution is uniform, and the concentration overpotential can be reduced.

The structure of the upstream unit cell (low temperature unit cell) is different from the structure of the downstream unit cell (high temperature unit cell). Optimum structure can be adopted for reaction in each of the unit cells. Specifically, the assembly of the upstream unit cell and the assembly of the downstream unit cell have the same power generation performance when the assembly of the upstream unit cell is operated at a lower temperature in comparison with the assembly of the downstream unit cell.

Further, the assembly of the $O_2$ upstream unit cell has the cathode including a hydrophobic diffusion layer having low porosity, and the anode including a hydrophilic diffusion layer having high porosity. The hydrophobic diffusion layer having low porosity is provided on the upper side, and the hydrophilic diffusion layer having high porosity is provided on the lower side.

Thus, when the oxygen-containing gas flows through the upper portion of the assembly of the upstream unit cell, in the presence of the hydrophobic diffusion layer having low porosity, the water produced in the power generation does not move downwardly by the gravity. Therefore, the desired humidity of the oxygen-containing gas is maintained suitably. When the fuel gas flows through the lower portion of the assembly of the $O_2$ upstream unit cell through the $O_2$ downstream unit cell, the condensed water moves through the hydrophilic diffusion layer having high porosity toward the solid polymer electrolyte membrane. Thus, humidity in the surfaces of the solid polymer electrolyte membrane and the electrodes are kept at the optimum level for power generation. Thus, the low humidified oxygen-containing gas or non-humidified gas can be supplied to the cell assembly.

Further, the assembly of the $O_2$ downstream unit cell has the anode including a hydrophobic diffusion layer having low porosity, and the cathode including a hydrophilic diffusion layer having high porosity. The hydrophobic diffusion layer having the low porosity is provided on the upper side, and the hydrophilic diffusion layer having high porosity is provided on the lower side.

Thus, when the fuel gas flows through the upper portion of the assembly of the downstream unit cell, in the presence of the hydrophobic diffusion layer having low porosity, the water produced in the power generation does not move downwardly by the gravity. Therefore, the desired humidity of the fuel gas is maintained suitably. The oxygen-containing gas is humidified at the time of passing through the upstream unit cell. After passing through the upstream unit cell, the humidified oxygen-containing gas flows through the lower portion of the assembly of the downstream unit cell. The condensed water move through the hydrophilic diffusion layer having high porosity toward the solid polymer electrolyte membrane. Thus, humidity in the surfaces of the solid polymer electrolyte membrane and the electrodes are kept at the optimum level for power generation. Thus, low humidified oxygen-containing gas or non-humidified gas can be supplied to the cell assembly. Further, the excessive water from the assembly is discharged efficiently by the gravity into the oxygen-containing gas flow passage provided at the lower portion of the assembly.

A connection passage member is provided between the juxtaposed unit cells. The connection passage member has a reactant gas connection passage and a coolant connection passage for serially supplying the reactant gas and the coolant. Thus, the cell assembly is compact as a whole, and the compact cell assembly can be installed at various positions easily and suitably.

BRIEF DESCRIPTION OF THE DRAWINGS

FIG. 1 is a view schematically showing main components of a solid polymer cell assembly according to a first embodiment of the present invention;

FIG. 2 is a view schematically showing distinctive structures of the cell assembly;

FIG. 3 is a view showing change in humidity in first and second unit cells;

FIG. 4 is a view showing change in temperature in the first and second cell unit cells; and FIG. 5 is a view schematically showing main components of a solid polymer cell assembly according to a second embodiment of the present invention.

BEST MODE FOR CARRYING OUT THE INVENTION

FIG. 1 is a view schematically showing main components of a solid polymer cell assembly 10 according to a first embodiment of the present invention.

The cell assembly 10 includes a plurality of unit cells, e.g., a first unit cell 12 and a second unit cell 14 which are juxtaposed such that electrode surfaces of the first and second unit cells 12, 14 are aligned in parallel with each other. A connection passage member 16 is provided between the first and second unit cells 12, 14. The first unit cell 12 is provided on the upstream side in a flow direction of an oxygen-containing gas (reactant gas) indicated by an arrow A, and the second unit cell 14 is provided on the downstream side in the flow direction of the oxygen-containing gas.

The first unit cell 12 includes a first assembly 18, and the second unit cell 14 includes a second assembly 20. Each of the first assembly 18 and the second assembly 20 comprises a cathode 24*a*, 24*b*, an anode 26*a*, 26*b*, and a solid polymer electrolyte membrane 22*a*, 22*b* interposed between the cathode 24*a*, 24*b* and the anode 26*a*, 26*b*. Each of the solid polymer electrolyte membranes 22*a*, 22*b* is formed by impregnating a thin membrane of perfluorosulfonic acid with water, for example. The solid polymer electrolyte membrane 22*a* is a relatively low temperature electrolyte membrane, and the solid polymer electrolyte membrane 22*b* is a relatively high temperature electrolyte membrane. Namely, the solid polymer electrolyte membrane 22*a* and the solid polymer electrolyte membrane 22*b* have the same power generation performance when the solid polymer electrolyte membrane 22*a* is operated at a low temperature in comparison with the solid polymer electrolyte membrane 22*b*.

Each of the cathodes 24*a*, 24*b*, and the anodes 26*a*, 26*b* includes base material chiefly containing carbon, and an electrode catalyst layer of noble metal deposited on the base material. A gas diffusion layer (porous layer) such as a porous carbon paper is provided on the surface of the electrode catalyst layer.

The cathode 24*a* of the first assembly 18 has a hydrophobic diffusion layer having low porosity. The cathode 24*a* is provided on the upper side in the direction indicated by an arrow C1. The anode 26*a* of the first assembly 18 has a hydrophilic diffusion layer having high porosity. The anode 26*a* is provided on the lower side in the direction indicated by an arrow C2. The anode 26*b* of the second assembly 20 has a hydrophobic diffusion layer having low porosity. The anode 26*b* is provided on the upper side in the direction indicated by the arrow C1. The cathode 24*b* of the second assembly 20 has a hydrophilic diffusion layer having high porosity. The cathode 24*b* is provided on the lower side indicated by the arrow C2.

The first separator 28*a* faces the cathode 24*a* of the first assembly 18, and the first separator 28*b* faces the cathode 24*b* of the second assembly 20. The second separator 30*a* faces the anode 26*a* of the first assembly 18, and the second separator 30*b* faces the anode 26*b* of the second assembly 20.

The cell assembly 10 includes the juxtaposed first and second unit cells 12, 14, and has an oxygen-containing gas flow passage (reactant gas flow passage) 32 for supplying the oxygen-containing gas serially from the first unit cell 12 to the second unit cell 14, and a fuel gas flow passage (reactant gas flow passage) 34 for supplying a fuel gas (reactant gas) serially from the second unit cell 14 to the first unit cell 12. Further, the cell assembly 10 has a coolant flow passage 36 for supplying a coolant serially from the first unit cell 12 to the second unit cell 14.

In the first unit cell 12, a first oxygen-containing gas passage 38 extends between the cathode 24*a* of the first assembly 18 and the first separator 28*a* in the direction indicated by the arrow A. The first oxygen-containing gas passage 38 is connected to an oxygen-containing gas connection passage 40 formed in a connection passage member 16. The oxygen-containing gas connection passage 40 is connected to a second oxygen-containing gas passage 42 formed between the cathode 24*b* of the second assembly 20 and the first separator 28*b* in the second unit cell 14.

The first oxygen-containing gas passage 38, the oxygen-containing gas connection passage 40, and the second oxygen-containing gas passage 42 of the oxygen-containing gas flow passage 32 are connected serially such that the oxygen-containing gas flows from the first unit cell 12 to the second unit cell 14.

In the second unit cell 14, a first fuel gas passage 44 is formed between the anode 26*b* of the second assembly 20 and the second separator 30*b*. The first fuel gas passage 44 is connected to a fuel gas connection passage 46 formed in the connection passage member 16. The fuel gas connection passage 46 is connected to a second fuel gas passage 48 formed between the anode 26*a* of the first assembly 18 and the second separator 30*a* in the first unit cell 12.

The first and second fuel gas passages 44, 48 have a counterflow arrangement with respect to the second and first oxygen-containing gas passages 42, 38 along the surfaces of the second and first assemblies 20, 18. The fuel gas flows in the fuel gas flow passage 34 in the direction opposite to the oxygen-containing gas flowing through the oxygen-containing gas flow passage 32. The first fuel gas passage 44, the fuel gas connection passage 46, and the second fuel gas passage 48 are connected serially such that the fuel gas flows from the second unit cell 14 to the first unit cell 12.

A first coolant passage 50 is formed on the second separator 30*a* of the first unit cell 12. The first coolant passage 50 has a counterflow arrangement with respect to the second fuel gas passage 48 such that the coolant flows in the first coolant passage 50 in a direction opposite to the flow direction of the fuel gas flowing through the second fuel gas passage 48. The first coolant passage 50 is connected to a coolant connection passage 52 formed in the connection passage member 16. The coolant connection passage 52 is connected to a second coolant passage 54 in the second unit cell 14. The second coolant passage 54 has a parallel flow arrangement with respect to the second oxygen-containing gas passage 42 on the second separator 28*b* of the second unit cell 14 such that the coolant flows through the second coolant passage 54 in parallel with the oxygen-containing gas flowing through the second oxygen-containing gas passage 42.

The coolant flow passage 36 has a parallel arrangement with respect to the oxygen-containing gas flow passage 32. The first coolant passage 50, the coolant connection passage 52, and the second coolant passage 54 are connected serially such that the coolant flows from the first unit cell 12 to the second unit cell 14.

Operation of the cell assembly 10 will be described below.

An oxidizing gas such as an oxygen-containing gas is supplied to the oxygen-containing gas flow passage 32, and a fuel gas such as a hydrogen-containing gas is supplied to the fuel gas flow passage 34. Further, a coolant such as pure water, an ethylene glycol or an oil is supplied to the coolant flow passage 36.

The oxygen-containing gas is supplied into the first oxygen-containing gas passage 38 of the first unit cell 12. Then, the oxygen-containing gas flows along the cathode 24*a* of the first assembly 18 in the direction indicated by the arrow A. After the oxygen-containing gas flows out of the first oxygen-containing gas passage 38, the oxygen-containing gas is supplied to the oxygen-containing gas connection passage 40, and flows in the direction of gravity indicated by the arrow C2. Then, the oxygen-containing gas flows into the second oxygen-containing gas passage 42 of the second unit cell 14. The oxygen-containing gas flows along the cathode 24*b* of the second assembly 20 of the second unit cell 14 in the direction indicated by the arrow A, and is discharged from the second unit cell 14.

The fuel gas is supplied into the first fuel gas passage 44 of the second unit cell 14. Then, the fuel gas flows along the anode 26b of the second assembly 20 in the direction indicated by the arrow B (opposite to the direction indicated by the arrow A). After the fuel gas flows out of the first fuel gas passage 44, the fuel gas is supplied to the fuel gas connection passage 46, and flows in the direction of gravity indicated by the arrow C2. Then, the fuel gas flows into the second fuel gas passage 48 of the first unit cell 12. The fuel gas flows along the anode 26b of the first assembly 18 of the first unit cell 12 in the direction indicated by the arrow A, and is discharged from the first unit cell 12.

In the first and second assemblies 18, 20, the oxygen-containing gas supplied to the cathodes 24a, 24b, and the fuel gas supplied to the anodes 26a, 26b are consumed in the electrochemical reactions at catalyst layers of the cathodes 24a, 24b and the anodes 26a, 26b for generating electricity.

The coolant supplied to the coolant flow passage 36 flows into the first coolant passage 50 of the first unit cell 12, and flows in the direction indicated by the arrow A. The coolant flows into the second coolant passage 54 of the second unit cell 14 through the coolant connection passage 52 of the connection passage member 16. After the coolant is used for cooling the first and second assemblies 18, 20, the coolant is discharged from the second unit cell 14.

FIG. 2 is a view schematically showing distinctive structures of the cell assembly 10 according to the first embodiment of the present invention. Specifically, a low humidified oxygen-containing gas (oxygen-containing gas which is humidified to a small extent) or a non-humidified oxygen-containing gas is supplied to the first oxygen-containing gas passage 38 of the first unit cell 12, and a low humidified fuel gas (fuel gas which is humidified to a small extent) or non-humidified fuel gas is supplied to the first fuel gas passage 44 of the second unit cell 14.

After the oxygen-containing gas passes through the first oxygen-containing gas passage 38 provided on the upper side of the first assembly 18, the oxygen-containing gas flows through the connection passage member 16 in the direction of gravity. Then, the oxygen-containing gas flows into the second oxygen-containing gas passage 42 provided on the lower side of the second assembly 20 of the second unit cell 14.

After the fuel gas passes through the first fuel gas passage 44 provided on the upper side of the second assembly 20 of the second unit cell 14, the fuel gas flow through the connection passage member 16 in the direction of gravity. Then, the fuel gas flows into the second fuel gas passage 48 provided on the lower side of the first assembly 18 of the first unit cell 12.

The oxygen-containing gas and the fuel gas flow along both surfaces of the first and the second assemblies 18, 20 in the opposite directions in a counterflow manner. The coolant and the oxygen-containing gas flow in the same direction, i.e., the coolant flows from the first coolant passage 50 of the first unit cell 12 to the second coolant passage 54 of the second unit cell 14 through the connection passage member 16 in the direction indicated by the arrow A.

Thus, the temperature of the first unit cell 12 is lower than the temperature of the second unit cell 14. Taking the temperature difference into account, the solid polymer electrolyte membrane 22a used in the first assembly 18 is capable of achieving the power generation performance equal to the power generation performance of the solid polymer electrolyte membrane 22b used in the second assembly 20 when the solid polymer electrolyte membrane 22a is operated at a low temperature in comparison with the solid polymer electrolyte membrane 22b.

The low humidified oxygen-containing gas or non-humidified oxygen-containing gas is supplied to the cathode 24a of the first assembly 18. In order to keep the humidity of the first assembly 18, the cathode 24a has the hydrophobic diffusion layer having low porosity. The fuel gas flows through the second unit cell 14 before the fuel gas is supplied to the anode 26a of the first assembly 18. Thus, the hydrogen partial pressure of the fuel gas supplied to the anode 26a is small, and the relative humidity of the fuel gas supplied to the anode 26a is high. Therefore, the anode 26a has the hydrophilic diffusion layer having high porosity so that water can move toward the cathode 24a smoothly.

Likewise, the low humidified fuel gas or non-humidified fuel gas is supplied to the anode 26b of the second assembly 20. Thus, in order to keep the humidity of the second assembly 20, the anode 26b has the hydrophobic diffusion layer having low porosity. The oxygen-containing gas flows through the first unit cell 12 before the oxygen-containing gas is supplied to the cathode 24b of the second assembly 20. Thus, the oxygen-containing gas supplied to the cathode 24b contains water produced in the first unit cell 12, i.e., the humidity of the oxygen-containing gas supplied to the cathode 24b is high. Therefore, the cathode 24b has the hydrophilic diffusion layer having high porosity so that water can move toward the anode 26b smoothly.

As described above, in the first embodiment, for example, the first unit cell 12 and the second unit cell 14 are juxtaposed such that the oxygen-containing gas flow passage 32 extends serially from the first unit cell 12 to the second unit cell 14. In the cell assembly 10, the flow rate of the oxygen-containing gas supplied to the first unit cell 12 provided on the upstream side is determined taking the flow rate of the oxygen-containing gas supplied to the second unit cell 14 provided on the downstream side into account, so that the sufficient flow rate of the oxygen-containing gas required for reaction in the second unit cell 14 can be supplied to the second unit cell 14. Thus, the flow rate of the oxygen-containing gas supplied into the cell assembly 10 is high.

Therefore, water condensation in the oxygen-containing gas flow passage 32 can be prevented, and the humidity is uniform in the first and second unit cells 12, 14. Further, the current density distribution is uniform in the first and unit cells 12, 14, and thus, the concentration overpotential can be reduced. Since the oxygen-containing gas is supplied into the cell assembly 10 at a high speed, the water produced in power generation can be discharged from the first and second unit cells 12, 14 efficiently.

In particular, the first oxygen-containing gas passage 38 is provided on the upper side of the first assembly 18, and the second oxygen-containing gas passage 42 is provided on the lower side of the second assembly 20. Therefore, the water produced in the first unit cell is reliably discharged from the first unit cell 12 to the second unit cell 14 by the gravity, and then, discharged from the second unit cell 14. The excessive water from the first assembly 18 is discharged downwardly into the second oxygen-containing gas passage 42 at a position below the first assembly 18 by the gravity. Thus, with the simple structure, it is possible to prevent the condensed water from being trapped in the first and second assemblies 18, 20.

The oxygen-containing gas flow passage 32 extending through the first and second unit cells 12, 14 is a long passage. The pressure loss is large, and thus, the oxygen-containing gas is distributed in the first and second unit cells 12, 14 efficiently, and the water produced in the first and second unit cells 12, 14 is discharged smoothly. The fuel gas flow passage 34 extends serially through the juxtaposed second and first unit cells 14, 12 such that the fuel gas flows from the second unit cell 14 to the first unit cell 12. Thus, the same advantage as with the oxygen-containing gas flow passage 32 can be obtained.

In the cell assembly 10, the first and second unit cells 12, 14 are juxtaposed such that electrode surfaces of the first unit cell 12 and electrode surfaces of the second unit cells 14 are aligned in parallel with each other. Thus, the first unit cell 12 and the second unit cell 14 can be handled independently. For example, only the performance test of the fist unit cell 12 can be carried out easily and accurately.

In the first unit cell 12, the low humidified oxygen-containing gas or the non-humidified oxygen-containing gas flows through the first oxygen-containing gas passage 38 in the direction indicated by the arrow A, and the fuel gas having a relatively high humidity flows through the second fuel gas passage 48 in the direction indicated by the arrow B. Thus, the water in the second fuel gas passage 48 moves from the anode 26a having the hydrophilic diffusion layer of high porosity to the solid polymer electrolyte membrane 22a. Therefore, it is possible to reliably prevent the solid polymer electrolyte membrane 22a from being dried. Even if the low humidified oxygen-containing gas or the non-humidified oxygen-containing gas is supplied to the cell assembly 10, the desired wet state of the solid polymer electrolyte membrane 22a can be maintained.

In the second unit cell 14, the oxygen-containing gas of high humidity, containing water produced in power generation flows through the second oxygen-containing gas passage 42 in the direction indicated by the arrow A, and the low humidified fuel gas or the non-humidified fuel gas flows through the first fuel gas passage 44 in the direction indicated by the arrow B. Thus, the water in the oxygen-containing gas passage 42 moves from the cathode 24b having the hydrophilic diffusion layer of high porosity to the solid polymer electrolyte membrane 22b. Therefore, it is possible to prevent the solid polymer electrolyte membrane 22b from being dried. Even if the low humidified gas or the non-humidified gas is supplied to the cell assembly 10, the desired wet state of the solid polymer electrolyte membrane 22b is maintained.

Next, FIG. 3 shows change in humidity of the first and second assemblies 18, 20, the first and second oxygen-containing gas passage 38, 42, and the first and second fuel gas passage 44, 48 in the first and second unit cells 12, 14.

In the first unit cell 12, the first assembly 18 is humidified by the fuel gas having high relative humidity flowing through the second fuel gas passage 48. In the second unit cell 14, the second assembly 20 is humidified by the oxygen-containing gas having high humidity flowing through the second oxygen-containing gas passage 42.

Thus, it may not be necessary to humidify the oxygen-containing gas and the fuel gas in supplying the oxygen-containing gas and the fuel gas to the cell assembly 10. It is possible to maintain the desired humidity of the first and second assemblies 18, 20, and improve the power generation performance of the first and second unit cells 12, 14.

FIG. 4 shows change in humidity of the first and second unit cells 12, 14. In the second unit cell 14, the humidity is high due to the water produced in the power generation. The second unit cell 14 is heated, and the relative humidity of the oxygen-containing gas is lowered (see FIGS. 3 and 4). Thus, water does not condense in the second unit cell 14. The current density distribution is uniform, and the concentration overpotential can be reduced.

Further, in the first embodiment, the connection passage member 16 is interposed between the first and second unit cells 12, 14. Thus, the cell assembly 10 is compact as a whole.

The cell assembly 10 can be handled easily, and installed at various positions easily and suitably.

FIG. 5 is a schematic view showing main components of a solid polymer cell assembly 80 according to a second embodiment of the present invention. The constituent elements that are identical to those of the cell assembly 10 according to the first embodiment are labeled with the same reference numeral, and description thereof will be omitted.

The cell assembly 80 includes a first fuel cell stack 82 formed by stacking a plurality of, e.g., three first unit cells 12, and a second fuel cell stack 84 formed by stacking a plurality of, e.g., three second unit cells 14, and a connection passage member 16 interposed between the first fuel cell stack 82 and the second fuel cell stack 84. The first fuel cell stack 82 and the second fuel cell stack 84 are juxtaposed together.

The connection passage member 16 may be formed by a single component. Alternatively, the connection passage member 16 may be formed by stacking three components. The first and second fuel cell stacks 82, 84 include manifold members 86, 88 for supplying/discharging the oxygen-containing gas, the fuel gas, and the coolant to/from the first and second unit cells 12, 14, respectively.

As described above, in the second embodiment, a plurality of the first and second unit cells 12, 14 are stacked together to form the first and second fuel cell stacks 82, 84, respectively for achieving the high output easily. Further, in the structure in which the oxygen-containing gas can be supplied externally to the connection passage member 16, it is possible to effectively reduce the flow rate of the oxygen-containing gas supplied to the first fuel cell stack 82.

INDUSTRIAL APPLICABILITY

According to the present invention, the flow rate of the reactant gas supplied to the unit cell on the upstream side is high since the flow rate of the reactant gas supplied to the unit cell on the downstream side is taken into account. Thus, it is possible to prevent the water condensation in the reactant gas flow passage, and the humidity is uniform in each of the unit cells. Accordingly, the current density distribution is uniform in each of the unit cells, and the concentration overpotential can be reduced.

The reactant gas flows at a high speed so that the water produced in power generation can be discharged from the unit cells efficiently. Further, a plurality of the unit cells are juxtaposed such that electrode surfaces of the unit cells are aligned in parallel with each other. Thus, the unit cells can be handled independently. Therefore, for example, the performance test can be performed individually for each of the unit cells easily and reliably.

The invention claimed is:

1. A solid polymer cell assembly comprising a cell assembly formed by juxtaposing a plurality of unit cells such that electrode surfaces of said unit cells are aligned in parallel with each other, said unit cell each having an assembly including an anode, a cathode, and a solid polymer electrolyte membrane interposed between said anode and said cathode, wherein said unit cells includes an upstream unit cell provided on an upstream side in a flow direction of a reactant gas including at least one of an oxygen-containing gas and a fuel gas, and a downstream unit cell provided on a downstream side in the flow direction, and wherein said unit cells include an upstream unit cell provided on the upstream side in a flow direction of the oxygen-containing gas, and a downstream unit cell provided on the downstream side in the flow direction of the oxygen-containing gas;

wherein a coolant flow passage is provided such that a coolant flows serially from said upstream unit cell provided on the upstream side in the flow direction of the oxygen-containing gas to said downstream unit cell provided on the downstream side in the flow direction of the oxygen-containing gas so that temperature of said downstream unit cell provided on the downstream side in the flow direction of the oxygen-containing gas is kept higher than temperature of said upstream unit cell provided on the upstream side in the flow direction of the oxygen-containing gas; and at least part of a reactant gas flow passage for said reactant gas extends serially from a passage formed on an upper side of the assembly of said upstream unit cell to a passage formed on a lower side of the assembly of said downstream unit cell, wherein said reactant gas flow passage includes a fuel gas flow passage and an oxygen-containing gas flow passage, and the oxygen-containing gas and the fuel gas flows in a counterflow manner in the oxygen-containing gas flow passage and the fuel gas flow passage along both surfaces of the assemblies of said unit cells.

2. A cell assembly according to claim 1, wherein structure of said upstream unit cell is different from structure of said downstream unit cell.

3. A cell assembly according to claim 2, the assembly of said upstream unit cell and the assembly of said downstream unit cell have the same power generation performance when the assembly of said upstream unit cell is operated at a low temperature in comparison with the assembly of said downstream unit cell.

4. A cell assembly according to claim 2, wherein said cathode of the assembly of said upstream unit cell has a hydrophobic diffusion layer having low porosity, and said anode of the assembly of said upstream unit cell has a hydrophilic diffusion layer having high porosity; and said hydrophobic diffusion layer having low porosity is provided on the upper side, and said hydrophilic diffusion layer having high porosity is provided on the lower side.

5. A cell assembly according to claim 2, wherein said anode of the assembly of said downstream unit cell has a hydrophobic diffusion layer having low porosity, and said cathode of the assembly of said downstream unit cell has a hydrophilic diffusion layer having high porosity; and said hydrophobic diffusion layer having low porosity is provided on the upper side, and said hydrophilic diffusion layer having high porosity is provided on the lower side.

6. A solid polymer cell assembly comprising a cell assembly formed by juxtaposing a plurality of unit cells such that electrode surfaces of said unit cells are aligned in parallel with each other, said unit cells each having an assembly including an anode, a cathode, and a solid polymer electrolyte membrane interposed between said anode and said cathode, wherein said unit cells includes an upstream unit cell provided on an upstream side in a flow direction of a reactant gas including at least one of an oxygen-containing gas and a fuel gas, and a downstream unit cell provided on a downstream side in the flow direction;

wherein at least part of a reactant gas flow passage for said reactant gas extends serially from a passage formed on an upper side of the assembly of said upstream unit cell to a passage formed on a lower side of the assembly of said downstream unit cell;

wherein a connection passage member is provided between said juxtaposed unit cells; and a reactant gas connection passage and a coolant connection passage are formed in said connection passage member for serially supplying the reactant gas and the coolant.

* * * * *